United States Patent
Lewyn

(10) Patent No.: US 6,255,884 B1
(45) Date of Patent: Jul. 3, 2001

(54) UNIFORM CLOCK TIMING CIRCUIT

(75) Inventor: Lanny L. Lewyn, Laguna Beach, CA (US)

(73) Assignee: Pairgain Technologies, Inc., Tustin, CA (US)

( * ) Notice: Subject to any disclaimer, the term of this patent is extended or adjusted under 35 U.S.C. 154(b) by 0 days.

(21) Appl. No.: 09/505,346

(22) Filed: Feb. 16, 2000

(51) Int. Cl.$^7$ ........................................ G06F 1/04
(52) U.S. Cl. ........................ 327/295; 327/293; 327/415
(58) Field of Search .......................... 327/291, 293, 327/295, 296, 403, 415, 400, 395, 210, 211, 212

(56) References Cited

U.S. PATENT DOCUMENTS 3,761,826 * 9/1973 Lowe ........................... 327/279
6,081,148 * 6/2000 Song ........................... 327/292

* cited by examiner

*Primary Examiner*—Terry D. Cunningham
*Assistant Examiner*—An T. Luu
(74) *Attorney, Agent, or Firm*—Jeffrey Slusher

(57) ABSTRACT

A plurality of intermediate driving devices are included in stages between a clock generator and a bank of synchronous logic devices. The outputs of the intermediate devices in each stage are connected in parallel over a wide linear dimension. The timing delay of each circuit is then subject to a small variation depending on the irregularities associated with the device characteristics used in its construction. The outputs of the intermediate devices in each stage are tied together to restore regularity and uniformity to all clock generation circuit outputs.

5 Claims, 2 Drawing Sheets

UNIFORM CLOCK TIMING CIRCUIT

BACKGROUND OF THE INVENTION

1. Field of the Invention

This invention relates to precision clock generation circuits and more particularly to high-speed clock generation in monolithic integrated circuits where close timing between a number of different clock loads is required.

2. Description of the Related Art

There is an ever-growing need to increase the speed at which analog signals can be converted into digital form. One common way to meet the requirement for high speed in analog-to-digital converters (ADC's) has been to use multiple comparators in an arrangement known as a basic flash converter. When implemented using Complementary Metal Oxide Semiconductor (CMOS) technology, such flash ADC's can be operated in the conversion frequency range well above 100 MHz. Several factors have, however, limited the resolution of such converters to below seven bits. These limiting factors include high-speed comparator input offsets and charge from the clock timing circuits feeding back or "blowing back" to the input.

Another important limiting factor in these prior art ADC designs are the non-uniform delays in the wiring associated with the clock inputs. Non-uniform delays in the clock generation circuitry occur whenever the delay from the primary clock generation circuit to the clock input of each comparator is not equal, with the result that irregularities arise in the conversion of rapidly varying analog input signals to digital form.

The errors which result from unequal clock delays are known in the art of flash ADC's as "differential phase errors." For example, for a 100MHz flash converter digitizing a 50 MHz sine wave, the time rate of change of a 1 volt peak input signal is equal to 2*pi*50E6, or 315 Megavolts per second. If the converter is to have 8-bit accuracy, the voltage error must be less than ½ bit as a result of differential timing error. Because ½ bit of a 2 volt peak to peak signal digitized to 8-bit accuracy corresponds to a voltage error of 4 millivolts, the differential timing error requirement is 6 picoseconds. It is quite difficult to apply the clock timing signal simultaneously to a 8-bit string of comparators with a timing uniformity of 12 picoseconds.

Accordingly, considerable research effort has been devoted to the task of improving the speed performance of high speed ADC's. Because the basic flash converter suffers from several problems, including the differential phase problem described above, algorithmic or pipelined flash converters have been used in 100 MHz applications. In these converters, clock generation problems are overcome by using only a few comparators, perhaps 16 or 32, in the initial conversion, and then passing the input signal remainders from the first conversion error output to a second and usually a third successive flash stage.

One drawback of such architectures—commonly known as pipelined architectures—is that they require sample-and-hold circuits at each stage. Moreover, although pipelined architectures have high throughput rates, they result in each output being available only after several clock cycles. This output delay prevents the converter from being useful in applications where the full digital output must be delivered in a few nanoseconds.

Another problem associated with existing devices based on multiple comparators is excessive load, which causes difficulties with wire matching. Of course, one way to reduce this problem is simply to reduce the number of comparators, in order to make it easier to match the routing, but one is still faced with the problem of non-uniformities in the devices themselves.

The problems discussed are particularly acute in the design of ADC's, since all circuits must operate at high speeds and with precise synchronization. They also arise, however, in other circuitry where components must operate at high speeds, driven synchronously by a common clock.

What is needed is thus a solution to the problems discussed above, in particularly, of timing skew in high-speed clock generation circuits, and particularly in the clock generation circuits required in high-speed basic flash converters.

SUMMARY OF THE INVENTION

The invention provides a clock timing circuit that has a power supply, a clock generator, a plurality of clocked logical devices, and at least one intermediate driving stage that includes a plurality of intermediate driving devices. The clock generator, the logical devices, and the intermediate driving devices are all powered by the power supply. The clock generator has an output clock signal, each of the clocked logical devices has a clock input, and each intermediate driving device in each intermediate driving stage has an input and an output. The output clock signal is connected to the inputs of the intermediate driving devices in a first stage and the outputs of the intermediate driving devices in a final stage are connected to the clock inputs of the logic devices. A non-branched, electrically conductive trace connects the outputs of the intermediate driving devices in at least one of the intermediate driving stages. In the preferred embodiment of the invention, each non-branched, electrically conductive trace is linear, and is formed of an electrically conductive material such as deposited aluminum or copper.

The preferred application of the invention is in an analog-to-digital converter (ADC), in which the logical devices are comparators. In the most common implementation of the ADC, each intermediate device is then an inverter.

DETAILED DESCRIPTION

Figure 1:
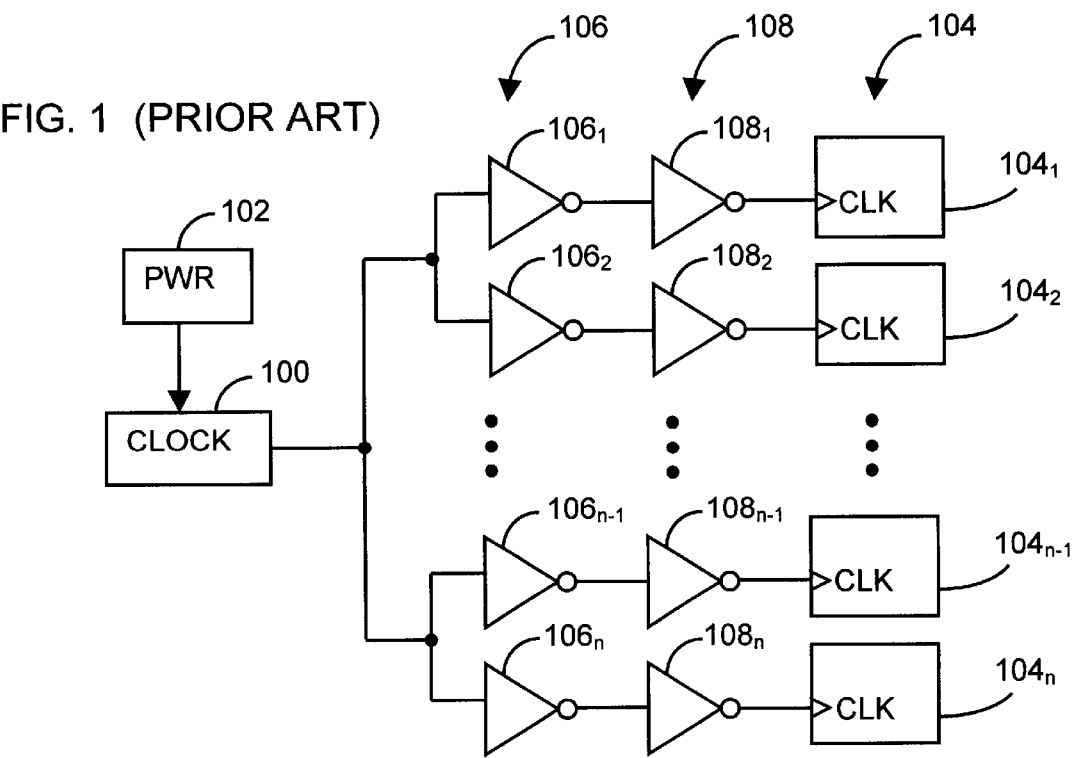
FIG. 1 is a block diagram of a generic circuit found in the prior art in which several logic devices are all driven by a common clock.

A conventional clock generation arrangement is illustrated in FIG. 1. As is well known, a main clock circuit 100, which is usually an amplified crystal-based oscillator, generates a clock signal, which is typically a square-wave pulse. A conventional power supply 102 is also included to power not only the clock circuit, but also all other components in the circuit, in any conventional manner. Each of a plurality of clocked digital devices $104_1, 104_2, \ldots, 104_n$, which, in ADC's are usually comparators, has a conventional clock input CLK. It is assumed that all the digital devices are to be synchronized, that is, they are all to perform their logical operations as close to simultaneously as possible. This is usually accomplished by having them all trigger on either a rising or falling edge of the clock signal. This of course raises the problem that this edge must then reach each device's clock input at the same time.

In many ADC circuits, the number n of devices $104_1$, $104_2, \ldots, 104_n$ may be large, on the order of hundreds. Consequently, because a standard clock generator 100 is not able to handle the load of such a large number of devices, intermediate driving and signal conditioning devices are typically included between the clock input of the devices and the generator. These intermediate devices are then separately and independently powered from the power supply 102. In many conventional ADC circuits, pairs of series-connected inverters are used as the intermediate drivers. In FIG. 1, these are indicated as the first-stage devices $106_1, 106_2, \ldots, 106_n$, and the second-stage devices $108_1, 108_2, \ldots, 108_n$. For the sake of simplicity, the devices $104_1, 104_2, \ldots, 104_n$; $106_1, 106_2, \ldots, 106_n$; and $108_1, 108_2, \ldots, 108_n$ are referred to below and labeled in the figures collectively as 104, 106, and 108, respectively. Note that, other than the power supply 102, all of the devices 100, 104, 106, and 108 and traces for the various electrical connections are, in a high-speed ADC, usually fabricated on the same substrate, using conventional MOS techniques.

The clock signal output from the generator 100 is the input to each pair of inverters, whose output will then in theory be identical to the clock signal. As in most cases, however, theory is confounded by physical reality. First is the problem of delay differences that may arise because the clock signal must propagate along n different paths, and it is impossible to guarantee that all of the 2*n intermediate components will have identical propagation properties, even when the devices 106, 108 are fabricated identically on the same substrate. Even were the clock signal to reach all of the devices 108 at the same time, the different output transistors may have delay times different enough to cause unacceptable differential phase errors.

Another problem with the conventional arrangement illustrated in FIG. 1 is that the uniform propagation time of the clock signal to the different devices 104 also depends on the lengths of the various conductive traces from the clock generator to the inputs of the devices 106 in the first stage. Each difference in length will translate into a corresponding time difference. The conventional way to reduce this effect is to try to arrange the traces in a branch structure as illustrated in FIG. 1. Although it is easy to ensure equal path lengths for branches that are located symmetrically relative to the middle of the branch pattern (such as $106_1$ and $106_n$, or $106_2$ and $106_{n-1}$), this is not as easy for other geometries, especially when the branch structure is very wide, since extra distance would need to be added for the devices nearest the root trace path from the clock generator.

Another problem is that any non-uniformity in the resistance-capacitance (RC-delay time constant) for any trace, given the small dimensions involved in MOS fabrication, will affect its propagation properties. The more complicated the trace pattern becomes, the more difficult it will be to maintain not only exactly equal lengths, but also exactly equal widths.

Figure 2:
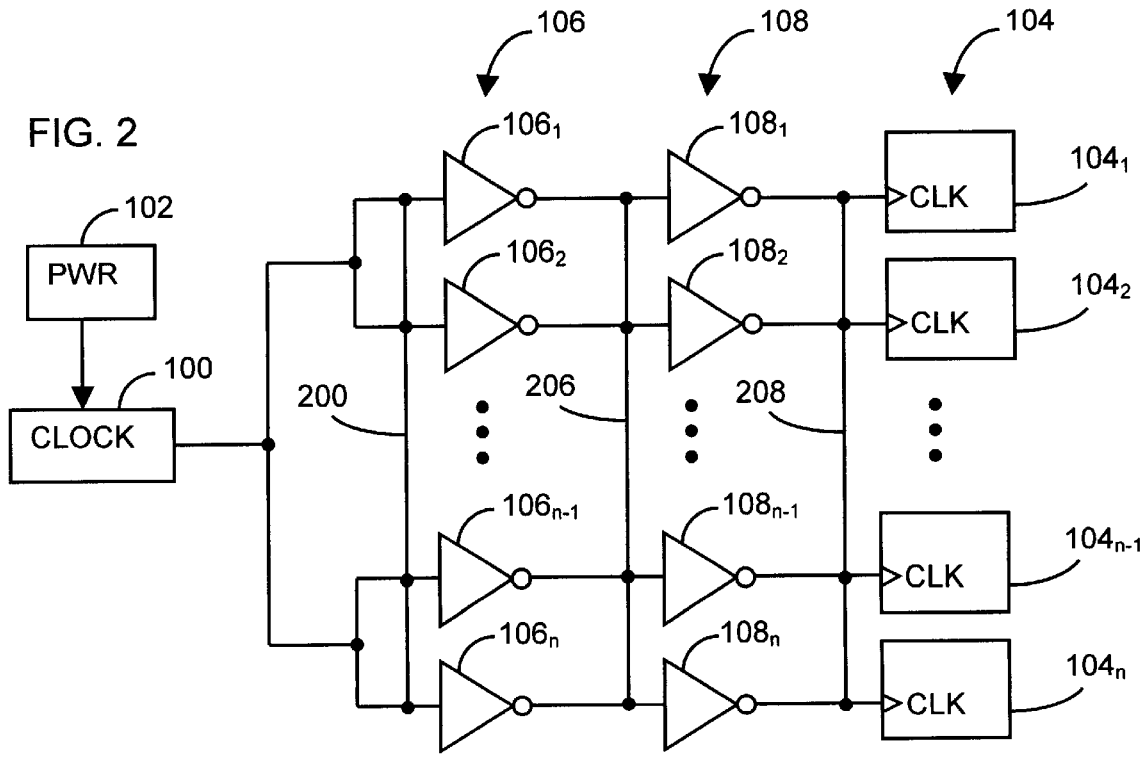
FIG. 2 is a block diagram of the circuit according to the invention in which a bank of clocked logic devices are synchronized by connecting outputs of drivers.

FIG. 2 illustrates the main aspect of the invention: At least the outputs of the intermediate devices in each stage are directly electrically connected by a single, nonbranched conductor. In the two-stage embodiment of the invention illustrated in FIG. 2, the outputs of the first-stage intermediate components 106 are all connected by conductor 206; the second-stage intermediate components 108 are, similarly, connected by a common conductor 208. As an additional aspect of the invention, all of the inputs of the first-stage intermediate devices 106 are also connected by a common, non-branched, preferably straight-line conductor 200, which thus also forms a common, non-branched conductor distributing the output of the clock generator 100. Note that whether it is the input or outputs of various devices that are connected in parallel according to the invention is merely a matter of perspective but not of substance: The output of the clock generator 100 is also the input to the first stage 106 of intermediate driving devices and the outputs of each stage are simply the inputs to the following stage, with the outputs of the final stage forming the inputs to the logic devices 104.

Figure 3:
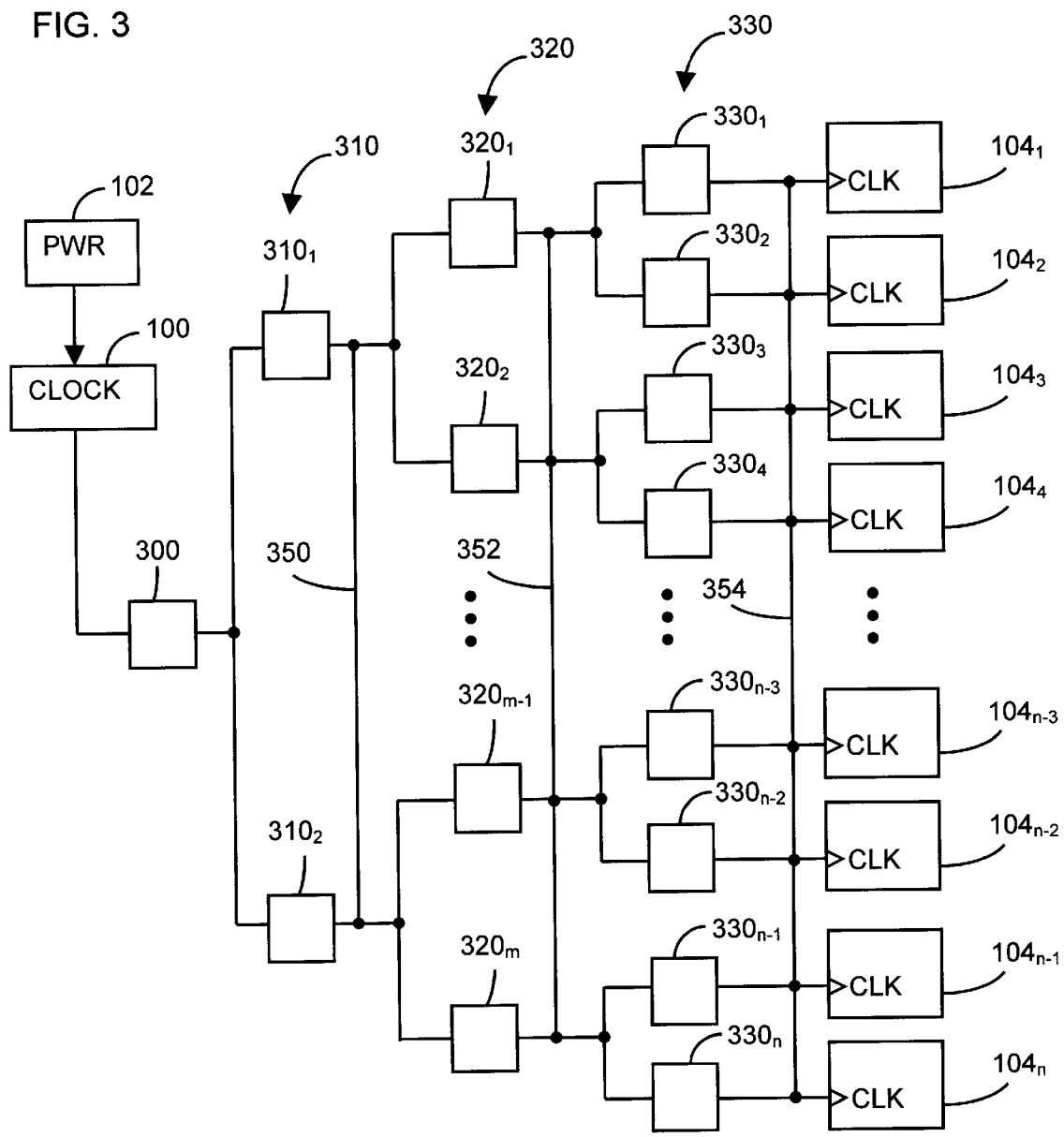
FIG. 3 is a block diagram of the circuit according to the invention in which a several stages of intermediate driving devices are connected between a clock generator and the bank of clocked logic devices.

As FIG. 3 illustrates, the use of a common, non-branched conductor to directly connect the outputs of even a large number of devices is not restricted to only two intermediate component stages, or to inverters as the intermediate conditioning components. Rather, in the illustrated example, there are four stages, with one (300), two (310, that is, $310_1$ and $310_2$), m (320, that is, $320_1, 320_2, \ldots 320_m$) and n (330, that is, $330_1, 330_2, \ldots, 330_n$ 330) devices in each stage, respectively. Although it is assumed that the devices in each individual stage are as identical as possible, intended to have the same propagation properties, it is not necessary for the components to be the same from one stage to the following or next stage. In the four-stage embodiment of the invention shown in FIG. 3, single, non-branched, preferably linear conductors 350, 352, 354 connect the outputs of the devices 310, 320, 330, respectively.

In general, the invention may be used with any number of intermediate stages (including one) between the clock generator 100 and the synchronous logic devices 104. The underlying assumption is, in all cases, that clock pulses derived from the original pulse from the clock generator 100 should arrive at the clock inputs of devices 104, that is, should cross the triggering amplitude threshold of the devices, as close to simultaneously as possible.

The non-branched output traces ("straps") 202, 204, 350, 352, 354 (as well as the common input conductor 200, which, as explained above, may also be considered a common output conductor if viewed from the clock generator 100) may be fabricated using standard MOS techniques using any conductive material such as aluminum or copper. One advantage of these common output traces is that they can each be fabricated using single, straight-line depositions of conductive metal. It is thus easy to maintain uniform dimensions and well-defined conductive properties. There is, moreover, no need to form them with the branched or "tree" pattern used for the main clock signal traces, which connect s the single output of the clock generator [single outputs] to multiple intermediate stage inputs. Note that each branch connection increases the risk of non-uniformity in propagation properties. For example, in FIG. 2, the single output of the clock generator 100 is led to many first-stage intermediate devices 106 and, in FIG. 3, the output of each second-stage intermediate device 320 is connected to the inputs of two third-stage devices 330.

In order to understand the advantages of including the common, non-branched, conductive output (or input) traces 202, 204, 350, 352, 354 (and the input conductor 200), refer again to FIG. 2. Assume now that any one (or more) of the devices in one intermediate stage, for example, device 1081, has slightly faster signal propagation than the others. Given the typical output circuitry of most intermediate driving circuitry, which may be a transistor with an output impedance of around 1 kOhms, then the voltage differential between the outputs of the various devices in the same stage will tend to be equalized because the fast devices will be loaded by the slower ones. The faster-rising device will then rise more slowly, more synchronously with the others. Conversely, any relatively slow device (one or more) that "lags" the others will tend to be speeded up by less loading from the faster ones.

By directly strapping together the outputs, the output elements (including active output elements, for example, transistors, or passive elements, for example, capacitors) in the various devices thus tend to load each other in such as way as to cause their output signals to follow the same rise or fall profile. This of course is the same as reducing the difference in time between when the earliest and latest devices' output voltages cross the triggering threshold (when an output pulse in the "0" state crosses the voltage limit for a "1," or vice versa). Put more succinctly, the invention ensures that the output signals from each intermediate driving stage are more synchronized. Tests have indicated that the time-difference error can be reduced by roughly a factor of ten by using the invention in an application involving two stages of driving inverters, as in FIG. 2.

It may not always be necessary to include common, non-branched conductive straps or traces to connect the outputs of intermediate devices in all stages. Rather, it may be sufficient in many applications to connect the outputs of intermediate devices in only the final stage, that is, the stage immediately preceding the clocked logic devices 104 that applies the actual clock signal to the logic devices 104. The choice of whether to use a single, final output strap, or a strap connecting the outputs of the driving devices in one or more of the other stages, will depend on the degree to which mutual loading of the driving devices in the final stage is sufficient, and sufficiently fast, to ensure synchronization of the devices' outputs. Each additional intermediate-stage output strap will tend to synchronize the outputs of that stage, and will reduce the need for mutual loading in the final intermediate stage.

The embodiments of the invention shown in FIGS. 2 and 3 also illustrate the general structure of the clock timing portion of an ADC, namely, a main clock signal from the clock generator 100 is applied via some branched trace pattern to the inputs of a first stage of driving devices, which propagate the clock signal ultimately to the clock inputs of the logic devices 104. In this application, the intermediate devices 106, 108, 300, 310, 320, 330 are typically inverters and the logic devices 104 are usually conventional comparators.

I claim:

1. A clock timing circuit comprising:

a power supply;

a clock generator powered by the power supply and having an output clock signal;

a plurality of clocked logical devices, each having a clock input;

at least one intermediate driving stage including a plurality of intermediate driving devices that are powered by the power supply;

in which:

each intermediate driving device in each intermediate driving stage has an input and an output;

the output clock signal is connected to the inputs of the intermediate driving devices in a first stage; and the outputs of the intermediate driving devices in a final stage are connected to the clock inputs of the logic devices;

further including:

a non-branched, electrically conductive trace connecting the outputs of the intermediate driving devices in at least one of the intermediate driving stages.

2. A clock timing circuit as in claim 1, in which each non-branched, electrically conductive trace is linear.

3. A clock timing circuit as in claim 1, in which each non-branched, electrically conductive trace is formed as deposited aluminum.

4. A clock circuit in an analog-to-digital converter (ADC) comprising:

a power supply;

a clock generator powered by the power supply and having an output clock signal;

a plurality of clocked comparators, each having a clock input;

at least one intermediate driving stage including a plurality of intermediate driving devices that are powered by the power supply;

in which:

each intermediate driving device in each intermediate driving stage has an input and an output;

the output clock signal is connected to the inputs of the intermediate driving devices in a first stage; and the outputs of the intermediate driving devices in a final stage are connected to the clock inputs of the comparators;

further including:

a non-branched, electrically conductive trace connecting the outputs of the intermediate driving devices in at least one of the intermediate driving stages.

5. A clock circuit as in claim 4, in which each intermediate device is an inverter.

* * * * *